United States Patent [19]

Nio et al.

[11] Patent Number: 4,528,632
[45] Date of Patent: Jul. 9, 1985

[54] INDUSTRIAL ARTICULATED ROBOT LINEAR INTERPOLATION CONTROL DEVICE

[75] Inventors: Satoru Nio; Shinobu Sato; Shigemi Nobayashi; Toyoji Hamashima, all of Kitakyushu, Japan

[73] Assignee: Kabushiki Kaisha Yaskawa Denki Seisakusho, Fukuoka, Japan

[21] Appl. No.: 355,657

[22] Filed: Mar. 8, 1982

[30] Foreign Application Priority Data

Mar. 18, 1981 [JP] Japan .................................. 56-38872

[51] Int. Cl.³ .......................... G05B 19/41; B25J 9/00; B25J 13/00
[52] U.S. Cl. ..................................... 364/169; 364/513; 318/568; 318/574; 901/2; 901/15; 901/20
[58] Field of Search ............... 364/169, 513, 701, 702, 364/719, 723; 318/573, 574, 568; 901/2, 15, 20

[56] References Cited

U.S. PATENT DOCUMENTS

| | | | |
|---|---|---|---|
| 3,109,092 | 10/1963 | Lott et al. ........................... | 364/723 |
| 3,518,513 | 6/1970 | Pomella et al. ...................... | 318/573 |
| 3,748,563 | 7/1973 | Pomella et al. ...................... | 318/573 |
| 3,864,557 | 2/1975 | Sindelar ............................... | 318/573 |
| 3,909,600 | 9/1975 | Hohn .................................... | 364/513 |
| 3,920,972 | 11/1975 | Corwin, Jr. et al. ................ | 364/513 |
| 4,031,369 | 6/1977 | Heaman et al. ...................... | 364/169 |
| 4,059,746 | 11/1977 | Haga .................................... | 364/169 |
| 4,163,183 | 7/1979 | Engelberger et al. ............... | 318/568 |
| 4,163,184 | 7/1979 | Leenhouts ........................... | 318/573 |
| 4,338,672 | 7/1982 | Perzley et al. ...................... | 364/513 |

Primary Examiner—Jerry Smith
Assistant Examiner—Allen MacDonald
Attorney, Agent, or Firm—Ladas & Parry

[57] ABSTRACT

In a control device for an industrial articulated robot, in the linear interpolation between two specified points, the distance between the two points is divided into segments, and the interpolation increments of the articulation drive axes for each interpolation internal, which correspond to the segments, are calculated for interpolation so that the interpolation increments are distributed uniformly with time.

2 Claims, 13 Drawing Figures

FLOW CHART OF LINEAR INTERPOLATION PROGRAM OF ARITHMETIC UNIT

FLOW CHART OF N# WAIT ROUTINE

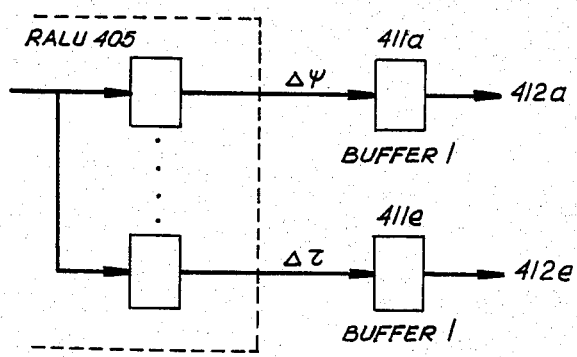
Fig. 10-A
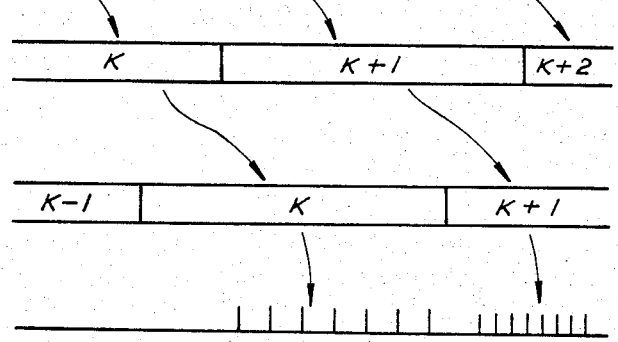
Fig. 10-B

INDUSTRIAL ARTICULATED ROBOT LINEAR INTERPOLATION CONTROL DEVICE

BACKGROUND OF THE INVENTION

This invention relates to a linear interpolation control device for an industrial articulated robot.

Articulated robots are compact and can be readily operated at high speed, when compared with other robots. However, it is difficult to perform the interpolation function accurately and economically.

In a cartesian coordinates robot, interpolation outputs in the orthogonal coordinate system (X, Y, Z) may be applied directly to drive axes X, Y and Z. On the other hand, an articulated robot needs intricate coordinate transformation between the articulation drive axes and the orthogonal coordinates in addition to the interpolation in the orthogonal coordinate system. In order to quickly and accurately perform interpolation calculations including the intricate coordinate transformation during the operation of the robot, it is necessary to use an expensive device such as a minicomputer. However, a minicomputer-operated robots have not been practically used yet, because they are not economical as an industrial articulated robot.

An approximate calculation method has been proposed in order to simplify the arithmetic operations; however, it is not practical because of large interpolation errors.

For an articulated robot of teaching playback type, an interpolation in which one pulse increment is applied to each drive axis for every reference clock pulse is not always necessary in a linear interpolation between two points taught, because, in the case where the distance between two points taught is short, it is moved directly with sufficiently high accuracy if uniform pulse distribution (simultaneous start and simultaneous stop method) is effected for the articulation drive axes so that the axes are moved at specified speeds.

That is, an interpolation control, in which interpolation errors can be neglected, can be achieved by employing the following method: The distance between two points taught is divided into segments of a length defined by a command velocity, an interpolation time interval and the distance between the two points. The incremental pulse numbers or increments of motion along each axis during each interpolation of the articulation drive axes, which correspond to each of the segments, are subjected to interpolation calculation, and BRMs (binary rate multipliers) are used to subject the incremental pulse numbers to uniform pulse distribution with respect to time.

When compared with a conventional linear interpolator using an expensive device such as a minicomputer to perform interpolation each pulse increment, this invention is advantageous in that it can be realized merely by adding some hardware such as BRMs to an inexpensive arithmetic unit because, in this invention, segment interpolation is employed and no trouble is caused even if it takes a relatively long period of time to achieve the interpolation calculation, including the coordinate transformation.

In the linear interpolation, it is necessary not only to directly move the tip of the gun connected to the robot wrist, but also to control the posture of the gun simultaneously. The posture of the gun is determined according to the contents of work and the kinds of work. For instance in the case of a welding robot, the posture of the gun, which is defined by a torch angle, an advancing angle, etc. must be maintained constant so that the posture causes no trouble in the welding operation.

In the case when a linear interpolation distance is short and it is necessary to abruptly change the posture of the wrist (or the gun), for instance, at a corner, if interpolation is carried out with the number of segments for every reference clock pulse as a reference, then the amount of movement of the wrist every reference clock pulse is excessively large, and sometimes it may exceed the maximum number of revolutions per minute of a wrist drive motor. This trouble is significant in the extreme case where the position of the tip of the gun is maintained nearly unchanged, i.e., the linear interpolation distance is substantially zero, and only the wrist is moved.

However, this problem can be solved by employing the following method: In the case where the amount of movement of the wrist axes does not exceed the maximum number of revolutions per minute of the drive motor, interpolation is effected with the number of segments for every reference clock pulse as reference, and the posture of the wrist is controlled so that it is uniformly changed between two points. In the case where the amount of movement of the wrist axes exceeds the maximum number of revolutions per minute of the motor, interpolation is carried out by changing the number of segments for every reference clock so that the amount of movement of the wrist axes for every reference clock pulse satisfies the maximum number of revolutions per minute of the motor.

The problem of stopping which occurs at a turning point between linear interpolations, can be solved by an advanced read calculation and a two-stage buffer pulse outputting method.

SUMMARY OF THE INVENTION

An object of this invention is to provide a control device for an articulated robot in which the number of segments for every reference clock pulse is switched according to whether or not the speed of the wrist axes exceeds the maximum number of revolutions per minute of the drive motor so that in both cases the position of the wrist is moved at a uniform speed between two points for linear interpolation, the interpolation calculation is carried out with high accuracy with an inexpensive simple arithmetic unit and a BRM pulse distribution circuit with a two-stage buffer means. Further no stop occurs at a turning point between linear interpolations; i.e., linear interpolation is carried out by smoothly connecting straight lines.

The foregoing object and other objects of the invention have been achieved by the provision of a control device for an industrial articulated robot according to a teaching playback system, in which, when linear interpolation between two points specified is carried out, a distance between the two points is divided into segments of a length defined by a command velocity, a reference clock period (or interpolation time interval) and the distance between the two points, and incremental pulse numbers of articulation drive axes, which correspond to each of the segments, are subjected to interpolation calculation, so that the incremental pulse numbers are pulse-distributed uniformly with respect to time.

The nature, principle and utility of the invention will become more apparent from the following detailed description when read in conjunction with the accompanying drawings.

BRIEF DESCRIPTION OF THE DRAWINGS

In the accompanying drawings:

FIG. 8-1 and FIG. 8-2 together are a flow chart of the N# program;

FIG. 9-1 and FIG. 9-2 together are a flow chart of the M# program;

FIG. 10-A shows the connection between the RALU (405) and buffer 1 of FIG. 4;

FIG. 10-B is a data transforming timing chart.

DETAILED DESCRIPTION OF THE INVENTION

A preferred embodiment of this invention will be described with reference to the accompanying drawings.

Figure 1:
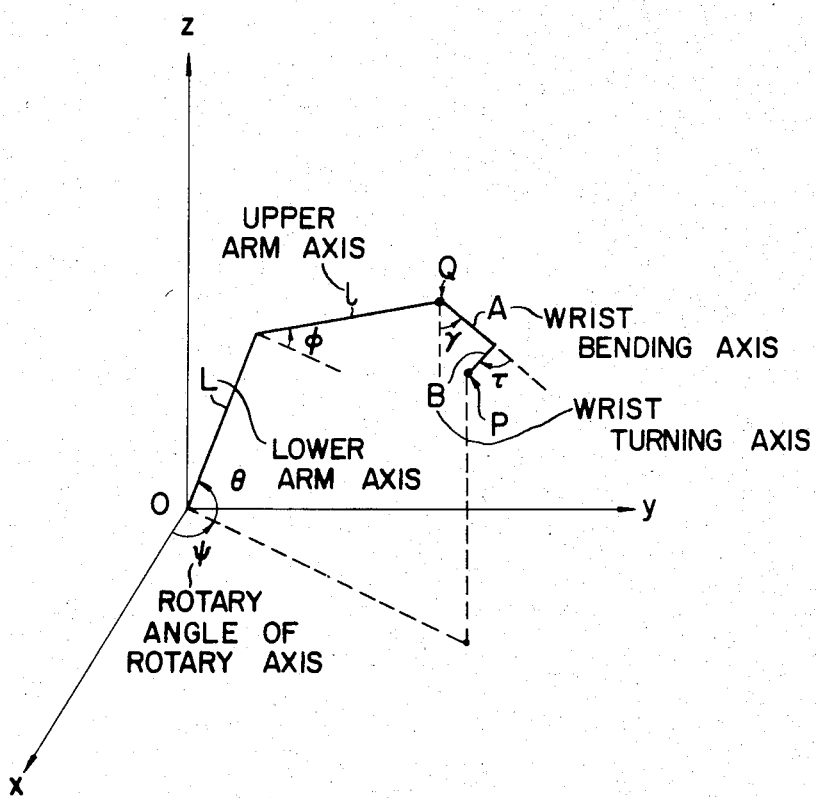
FIG. 1 is a diagram showing a model of a multi-articulated robot.

FIG. 1 shows a model of a multi-articulated robot. The rotary axis, the lower arm axis L and the upper arm axis l are controlled by rotation angles $\psi$, $\theta$ and $\phi$, respectively; and the wrist bending axis and the turning axis are controlled by rotation angles $\gamma$ and $\tau$, respectively.

Figure 2:
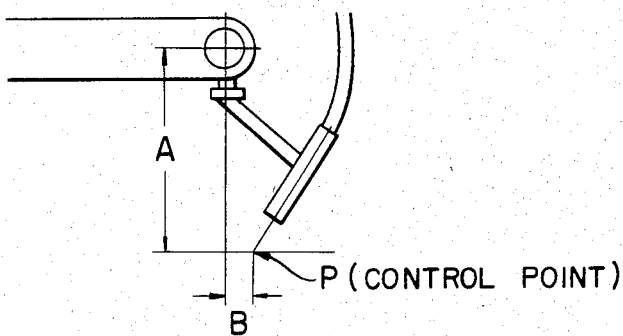
FIG. 2 is an external view showing the wrist of the robot and a gun connected thereto.

FIG. 2 shows the wrist of the robot and a gun secured thereto.

In FIG. 1, the point P which is spaced a distance A from the center Q of rotation of the wrist bending axis and a distance B from the center of rotation of the turning axis is a control point which should be subjected to linear interpolation.

The position of the point P can be expressed in the orthogonal coordinate system by using the articulation drive angles $\psi$, $\theta$, $\phi$, $\gamma$ and $\tau$, according to the following expressions:

$$\left.\begin{array}{l} X = (L\cos\theta + l\cos\phi + A\sin\gamma + B\cos\tau \cdot \cos\gamma) \\ \quad \cdot \cos\phi - B\sin\tau \cdot \sin\psi \\ Y = (L\cos\theta + l\cos\phi + A\sin\gamma + B\cos\tau \cdot \cos\gamma) \\ \quad \cdot \sin\psi + B\sin\tau \cdot \cos\psi \\ Z = L\sin\theta + l\sin\phi - A\cos\gamma + B\cos\tau \cdot \sin\gamma \end{array}\right\} \quad (1)$$

In the linear interpolation during the play back mode between the start and end points which are taught by an articulation drive system, first the start point $P_1$ ($\psi_1$, $\theta_1$, $\phi_1$, $\gamma_1$, $\tau_1$) and the end point $P_2$ ($\psi_2$, $\theta_2$, $\phi_2$, $\gamma_2$, $\tau_2$) are expressed as ($x_1$, $y_1$, $z_1$) and ($x_2$, $y_2$, $z_2$) in the orthogonal coordinate system, respectively.

The distance D between the two points is:

$$D = \sqrt{\delta x^2 + \delta y^2 + \delta z^2} \quad (2)$$

-continued
where $\delta x = x_2 - x_1$,
$\delta y = y_2 - y_1$,
$\delta z = z_2 - z_1$,
$\delta\gamma = \gamma_2 - \gamma_1$, and
$\delta\tau = \tau_2 - \tau_1$.

The number of times ($N_1$) of segment interpolation for every reference clock pulse is:

$$N_1 = D/(C_0 V_0) \quad (3)$$

where $C_0$ is the reference clock period, and $V_0$ is the tangential speed.

Therefore, the portion or length of segment outputted every reference clock pulse is represented by the following:

$$\Delta x = \delta x/N_1, \Delta y = \delta y/N_1, \Delta z = \delta z/N_1, \quad (4)$$

$$\Delta\gamma = \delta\gamma/N_1, \text{ and } \Delta\tau = \delta\tau/N_1$$

This value is the amount of movement for every reference clock pulse, i.e., the speed.

As was described before, when the position of the wrist axes changes abruptly, for instance, at a corner, sometimes the speed of the wrist axes may exceed the maximum number of revolutions per minute of the drive motor. In order to prevent this, the following values $N_2$ and $N_3$ are calculated:

$$N_2 = \delta\gamma/\gamma_{max}, \text{ and } N_3 = \delta\tau/\tau_{max} \quad (5)$$

where $\gamma_{max}$ and $\tau_{max}$ are the amounts of movement per reference clock period when the number of revolutions per minute of the wrist drive motor is at maximum. The magnitudes of $N_1$, $N_2$ and $N_3$ are determined, and the maximum of the magnitudes thus determined is employed as the number of times of segment interpolation. When $N_1 > N_2$ and $N_1 > N_3$, the portion or length of segment is as indicated by the expression (4); and when $N_2 > N_1$ and $N_2 > N_3$, $$\Delta x = \delta x/N_2, \Delta y = \delta y/N_2, \Delta z = \delta z/N_2, \quad (6)$$

$$\Delta\gamma = \delta\gamma/N_2, \text{ and } \Delta\tau = \delta\tau/N_2$$

When $N_3 > N_1$ and $N_3 > N_2$, $N_3$ is substituted for $N_2$ in the expression (6).

The values $\Delta x$, $\Delta y$ and $\Delta z$ which are calculated according to the expressions (4) or (6) are accumulated as present values. Reverse transformation is effected by using the present values x, y, z, $\gamma$ and $\tau$, to obtain $\psi$, $\theta$ and $\phi$. The differences $\Delta\psi$, $\Delta\theta$, $\Delta\phi$, $\Delta\gamma$, $\Delta\tau$ between these values ($\psi$, $\theta$, $\phi$, $\gamma$, $\tau$) and those at the time of the previous reference clock pulse are outputted, as command pulses, to the axis drive position servo-mechanisms through the BRM, to subject the control point P to linear interpolation.

At the last outputting of the difference signals, correction of $\Phi_2 - \Phi = \Delta\Phi$, $\theta_2 - \theta = \Delta\theta$, $\phi_2 - \phi = \Delta\phi$, $\gamma_2 - \gamma = \Delta\gamma$ and $\tau_2 - \tau = \Delta\tau$ is carried out to correct errors such as computational errors, so that return to the positioning point taught is effected.

Figure 3:
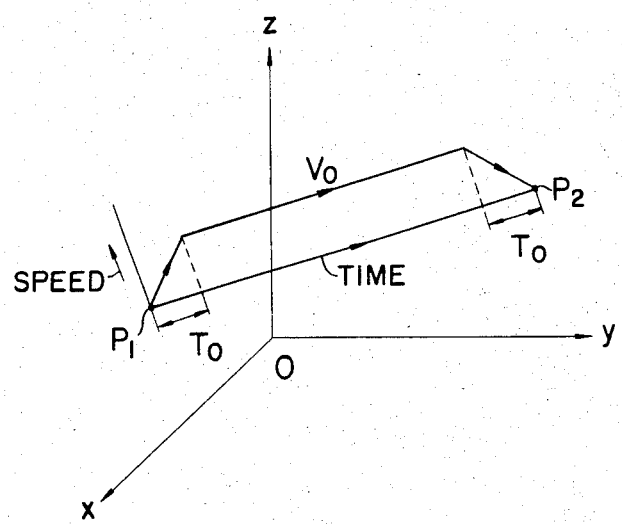
FIG. 3 is an explanatory diagram for a description of a linear interpolation which is effected between specified start and end point while performing linear acceleration or deceleration.

FIG. 3 is an explanatory diagram for a description of the case where the linear interpolation between the start point $P_1$ and the end point $P_2$ is carried out while linear acceleration and deceleration are effected.

The number of times of segment interpolation $N_0$ in the acceleration and deceleration time $T_0$ is:

$$N_0 = T_0/C_0 \qquad (7)$$

An advance distance $L(N)$ in the time $T_0$ is:

$$L(N) = \frac{V_0 C_0^2 N^2}{2T_0} \qquad (8)$$

When the distance D between the start and end points is larger than $2L(N_0)$ or $D > 2L(N_0)$, there is a constant or steady speed part or part. When $D \leq 2L(N_0)$, there are only acceleration and deceleration portions.

The number ($N_4$) of times of segment interpolation for the acceleration and deceleration portion is:

$$N_4 = N_0 \text{ when } D > 2L(N_0)$$

When $D \leq 2L(N_0)$, $D/2$ is inserted in the left side of the expression (8) to obtain N, which is $N_4$.

The number ($N_5$) of times of segment interpolation for the constant speed portion is:

When $D \leq 2L(N_0)$, $N_5 = 0$ \qquad (9)

When $D > 2L(N_0)$, $$N_5 = \frac{D - 2L(N_0)}{C_0 V_0}$$

Accordingly, the total number ($N_1$) of times of segment interpolation is:

$$N_1 = 2N_4 + N_5 \qquad (10)$$

$N_1$ thus obtained is compared with $N_2$ or $N_3$.

In the case of $N_1 \geq N_2$ and $N_1 \geq N_3$, $N_1$ is employed as the total number of times of segment interpolation, as is.

In the case of $N_1 < N_2$ or $N_1 < N_3$, the specified speed is not in agreement with the motion of the wrist. Therefore, it is necessary to amend the speed $V_0$ to be consistent with the motion of the wrist.

In the case of $D \leq 2L(N_0)$, with $N_4 = N_2/2$, the amended speed $V_0'$ is obtained from the expression (8).

In the case of $D > 2L(N_0)$, with $N_1 = N_2$ and $N_4 = N_0$, the number $N_5$ of times of segment interpolation for the constant speed portion is obtained from the expression (10) and is then inserted into the expression (9), to obtain the amended speed $V_0'$.

With $V_0 = V_0'$, the following calculations are carried out:

At the K-th reference clock, the axes components of the advance distance for the acceleration portion are:

$$\begin{pmatrix} dx(k) \\ dy(k) \\ dz(k) \end{pmatrix} = \frac{L(k)}{D} \begin{pmatrix} \delta x \\ \delta y \\ \delta z \end{pmatrix} \qquad (11)$$

and the axes components of the advance distance for the constant speed portion is:

$$\begin{pmatrix} U_x \\ U_y \\ U_z \end{pmatrix} = \left(1 - \frac{2L(N_0)}{D}\right) \begin{pmatrix} \delta x \\ \delta y \\ \delta z \end{pmatrix} \qquad (12)$$

Each advance distance can be obtained by dividing the expression (12) by $N_5$.

At the time of acceleration, values obtained by adding the expression (11) to the coordinates of the start point are employed as the present values. At the time of constant speed, values obtained by adding the preceding values to values obtained by dividing the expression (12) by $N_5$ are employed as the present values. At the time of deceleration, values obtained by subtracting the expression (11) (in which $K = N_4 - K$ is inserted) from the coordinates of the end point are employed as the present values.

The values of two axes of the wrist are uniformly distributed irrespective of acceleration and deceleration:

$$\Delta \gamma = \delta \gamma / N_1 \text{ and } \Delta \tau = \delta \tau / N_1 \qquad (13)$$

Every reference clock pulse, $\psi$, $\theta$ and $\phi$ are obtained from the present values of x, y, z and $\gamma$ and $\tau$ in a manner similar to the case where no acceleration and deceleration is effected, and the difference $\Delta \psi$, $\Delta \theta$, $\Delta \phi$, $\Delta \gamma$ and $\Delta \tau$ between the present values at the present reference clock pulse and those at the previous reference clock pulse are applied, as command pulses, to the axes servos through the aforementioned BRM.

The amendment for the last time is carried out in a manner similar to the case where no acceleration and deceleration is effected.

Figure 4:
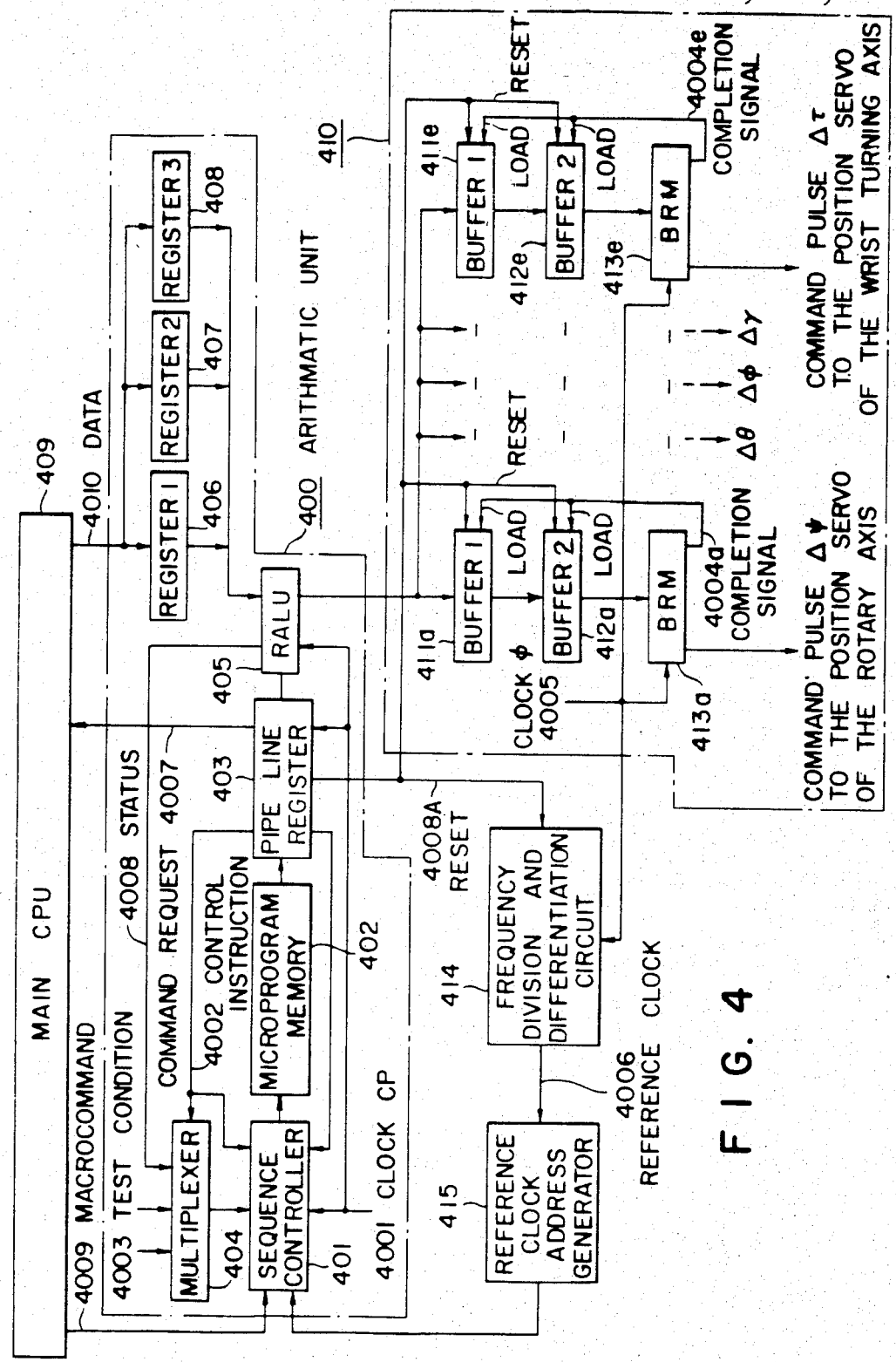
FIG. 4 is a block diagram showing the arrangement of one embodiment of this invention.

FIG. 4 is a block diagram showing the connection of a linear interpolation control unit composed of an arithmetic unit and a BRM with two stages of buffers, and main CPU (central processing unit) for controlling them.

In the case where, in response to a command request 4007 from the arithmetic unit, linear interpolation is carried out on the entire robot operation sequence, the main CPU 409 reads out of a memory (not shown) data of each axis pulse number from the original position of the articulation drive axes, tangential speed and presence or absence of acceleration or deceleration at the start point and the end point of linear interpolation, to set the data in a register "1" (406), a register "2" (407) and a register "3" (408), and outputs a linear interpolation start macrocommand 4009.

The arithmetic unit 400 is composed of a sequence controller 401, a microprogram memory 402, a pipe line register 403, a multiplexer 404, a RALU (register and arithmetic logical unit) 405, the register "1" (406), the register "2" (407) and the register "3" (408).

The sequence controller 401 is an address controller for controlling the execution sequence of microinstructions stored in the microprogram memory 402. It carries out various addressing and stack controls according to a control instructions 4002 from the pipe line register 403.

More specifically, the sequence controller 401 deals with the incrementing of an address being executed, selection of an address specified by a macrocommand 4009, selection of an address specified by a reference clock address generator 415, selection of a jump address given by the pipe line register 403 in the case of a conditional jump according to a test condition 4003 including a status 4008 of the RALU, selection of a jump address given by the pipe line register 403 in the case of a nonconditional jump, and stack control at the time of microsubroutine call.

The macrocommand 4009, and outputs from the reference clock address generator 415 and the pipe line register 403 are employed as input data for addressing.

The sequence controller 401 selects one of these data according to a microprogram, i.e., control instructions 4002 from the pipe line register 403.

In the case of the linear interpolation, only a linear interpolation start command is provided as the macrocommand 4009. The command is provided to indicate the entry address (hereinafter represented merely by a symbol N#, when applicable) of a linear interpolation service microprogram used by the hardware.

The output of the reference clock address generator 415 is provided to indicate the entry address (hereinafter represented merely by a symbol M#, when applicable) of a service microprogram for obtaining the numbers of the increment pulses $\Delta\psi$, $\Delta\theta$, $\Delta\phi$, $\Delta\gamma$ and $\Delta\tau$ of each articulation from the aforementioned data $\Delta x$, $\Delta y$, $\Delta z$, $\Delta\gamma$ and $\Delta\tau$.

Thus, M# is included in a series of microprograms for obtaining the numbers of the increment pulses $\Delta\psi$, $\Delta\theta$, $\Delta\phi$ and $\Delta\tau$, beginning with N#.

At the start of linear interpolation, after obtaining the incremented pulse numbers $\Delta\psi$, $\Delta\theta$, $\Delta\phi$, $\Delta\gamma$ and $\Delta\tau$ beginning with N#, the arithmetic unit 400 waits for a reference clock pulse, 4006 in a wait routine.

Thereafter, whenever the reference clock signal 4006 is produced, the arithmetic unit 400 starts an arithmetic operation for obtaining $\Delta\psi$, $\Delta\theta$, $\Delta\phi$, $\Delta\gamma$ and $\Delta\tau$ beginning with M#, and waits for the next reference clock 4006. The unit 400 repeatedly carries out this operation until a block end occurs.

In the other cases, addressing is effected by a jump address, subroutine call address and current address increment provided by the pipe line register 403.

The microprogram memory 402 is the center of the arithmetic unit 400. All of the arithmetic operations are carried out according to instructions from the microprogram memory 402.

The pipe line register 403 is a buffer register for the microprogram memory 402. The register 403 outputs micro instructions to be executed at that time to the RALU 405, outputs control instructions 4002 for determining the next microaddress to the sequence controller 401 and the multiplexer 404, and outputs the jump address, subroutine call address and current address increment to the sequence controller 401. When the block end occurs upon completion of the linear interpolation, the pipe line register 403 applies a command request 4007 to the main CPU.

The pipe line register 403 forms two signal paths. The operations in the signal paths are carried out in a parallel mode, to reduce micro cycle time and to thus increase the arithmetic operation speed.

One of the two signal paths is a control path consisting of the pipe line register 403, the sequence controller 401 and the microprogram memory 402 which are connected in the stated order, and the other is an arithmetic path consisting of the pipe line register 403 and the RALU. The pipe line register 403 is provided in order to operate the two paths in a parallel mode during the same clock cycle.

At the rise of a clock signal CP4001, the next instructions of the microprogram, which is prepared in the control path, has already been applied to the pipe line register 403. Therefore, high speed operation in which the memory fetch time is substantially zero can be carried out.

The multiplexer 404 applies the RALU status 4008 and test conditions 4003 such as external conditions to the sequence controller 401 in response to the control instructions from the pipe line register 403, thereby to effect the conditional jump.

The RALU 405 is made up of a logic and arithmetic calculation unit and programmable registers, to carry out calculation instructions specified by the microprogram. The calculation results, or the incremental pulse numbers of the articulation drive axes for every reference clock pulse are stored in the predetermined registers in the RALU 405.

The register "1" (406) and the register "2" (407) store the numbers of pulses from the original positions of the articulation drive axes at the start and end points of a linear interpolation. The register "3" (408) stores tangential speed of linear interpolation, acceleration and deceleration time, and presence or absence of acceleration or deceleration.

Buffers "1" (411a through 411e) are registers which store increment pulse numbers which are to be outputted with the next reference clock for each articulation drive axis, and buffers "2" (412a through 412e) are registers which store increment pulse numbers which are being outputted at the present time.

BRMs 413a through 413e uniformly distribute, as pulses synchronous with a clock signal $\phi$ 4005, the pulse numbers stored in the buffers "2" within the reference clock period, and output completion signals 4004a–4004e for buffer transferring every reference clock 4006.

The buffers "1", the buffers "2" and the BRMs form a two-stage buffer pulse distributing unit.

A frequency division and differentiation circuit 414 forms the reference clock signal 4006, from the clock signal $\phi$ 4005, which was frequency-divided by the number of bits of the BRMS 413a through 413e, to synchronize the BRM output completion signals 4004a–4004e with the reference clock signal 4006.

Further in FIG. 4, reference numeral 415 designates an address generator to generate M# from the reference clock signal 4006.

The linear interpolation operation of the circuitry shown in FIG. 4 will be described.

The arithmetic unit 400 first executes the wait routine, to cause the pipe line register 403 to apply the command request 4007 to the main CPU 409. The sequence controller 401 carries out address control to perform the wait routine while receiving the control instruction 4002 for N# selection from the pipe line register 403, upon reception of the macrocommand 4009.

As the wait routine includes an instruction 4008A for resetting the frequency division and differentiation circuit 404, no reference clock signal 4006 is produced thereby.

Before the linear interpolation is started, the main CPU 409 sets data 4010 of start point, end point, tangential speed, acceleration and deceleration time and presence or absence of acceleration or deceleration in the register "1" 406, the register "2" 407 and the register "3" 408.

When the main CPU 409 outputs the linear interpolation start macrocommand 4009, the linear interpolation microprogram beginning with N# is executed.

As instructions for releasing the reset signal 4008A of the frequency division and differentiation circuit 414 has been stored in N#, the circuit 414 starts counting pulses of the clock signal Φ (4005).

Thereafter, the sequence controller 401 operates to carry out the addressing necessary for arithmetic operation, until the generation of the output from the reference clock address generator 415.

The arithmetic unit 400 calculates $P_1$ ($x_1$, $y_1$, $z_1$) and $P_2$ ($x_2$, $y_2$, $z_2$) according to the expression (1) with the pulse numbers of each articulation drive axis at the start and end points, and obtains the distance D from the expression (2) and the values $N_2$ and $N_3$ from the expression (5). The arithmetic unit 400 further obtains the number ($N_1$) of times of segment interpolation for every clock by inserting the tangential speed $V_0$ stored in the register "3" in the expression (3).

In the case where no acceleration or deceleration is effected, $N_1$, $N_2$ and $N_3$ are subjected to comparison, so that segments (amounts of increment) $\Delta x$, $\Delta y$, $\Delta z$, $\Delta \gamma$ and $\Delta \tau$ per pulse of reference clock signal 4006 are obtained from the expression (4) or (6).

In the case where acceleration or deceleration is effected, the amounts of increments at the times of acceleration, steady speed and deceleration are obtained from the expressions (8) through (13).

Next, the microprogram advances to M#, the values $\psi$, $\theta$ and $\phi$ are obtained through the reverse conversion of the expression (1) by using the present values which are obtained by adding $\Delta x$, $\Delta y$, $\Delta z$, $\Delta \gamma$ and $\Delta \tau$ to $x_1$, $y_1$, $z_1$, $\gamma_1$ and $\tau_1$ of the start point.

The differences $\Delta \psi$, $\Delta \theta$, $\Delta \phi$, $\Delta \gamma$ and $\Delta \tau$ between the values $\psi$, $\theta$, $\phi$, $\gamma$ and $\tau$ and the values $\psi_1$, $\theta_1$, $\phi_1$, $\gamma_1$ and $\tau_1$ of the start point are set in the predetermined registers in the RALU 405, and a wait routine is performed. The wait routine, unlike a wait routine for waiting for N#, waits for the next pulse of reference clock signal 4006, i.e., M#, and the frequency division and differentiation circuit 414 is not reset.

The clock signal Φ 4005 and the number of bits of the BRMs 413a through 413e are so set that the reference clock (4006) period is longer than the time interval which elapses until the above-described calculations are achieved. Therefore, even if the calculation time is sufficiently long, there is no trouble.

In the case where the arithmetic unit 400 performs the wait routine for waiting for M#, when the reference clock signal 4006 is produced, simultaneously the BRMs 413a through 413e output the output completion signals, so that $\Delta \psi$, $\Delta \theta$, $\Delta \phi$, $\Delta \gamma$ and $\Delta \tau$ from the predetermined registers in the RALU 405 are loaded in the five buffers "1" (411a through 411e), respectively, and the contents of the buffers "1" (411a through 411e) are loaded in the buffers "2" (412a through 412e).

With the initial reference clock signal 4006, as the buffers "1" 411a through 411e have been maintained cleared, zero (0) is loaded in the buffers "2" 412a through 412e and pulse outputting is not carried out by the BRMs 413a through 413e.

The reference clock address generator 415 is operated by the reference clock signal 4006, the microprogram is executed beginning with M#, so that $\psi$, $\theta$, $\phi$, $\gamma$ and $\tau$ are obtained through reverse conversion of the expression (1) by using the new present values which are obtained by adding the increments $\Delta x$, $\Delta y$, $\Delta z$, $\Delta \gamma$ and $\Delta \tau$ of this time to the previous present values x, y, z, $\gamma$ and $\tau$, and the differences $\Delta \psi$, $\Delta \theta$, $\Delta \phi$, $\Delta \gamma$ and $\Delta \tau$ are set in the predetermined registers in the RALU 405 similarly as in the above-described case, and the wait routine for waiting for the next M# is effected. The previous contents of the buffers "1" 411a through 411e are loaded in the buffers "2" 412a through 412e, and command pulse outputting to the axis position servos is carried out by the BRMs 413a through 413e.

The above-described operations are repeatedly carried out until the control point P reaches the end point and the block end occurs.

While the two-stage buffers and BRMs perform pulse outputting, the next data are loaded in the buffers "1" 411a through 411e at all times. Therefore, even when a connecting point between linear interpolations is reached, the robot is moved smoothly, without stopping at connecting point.

The robot stops only once at the beginning of a number of linear interpolations. This is the case where the robot stops in any event, and therefore, the stop will not affect the smooth motion of the robot at all.

Figure 5:
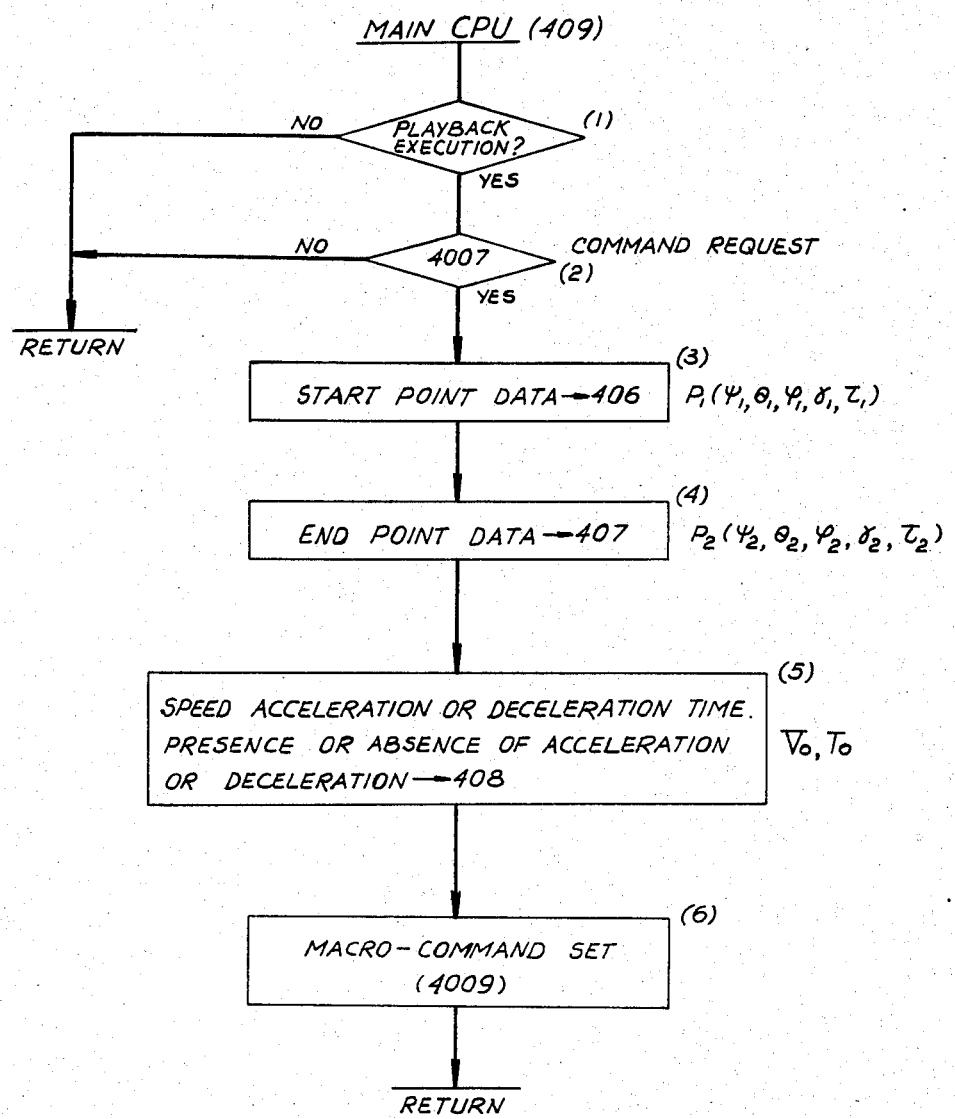
FIG. 5 is a main CPU flow chart.

Explanation of FIG. 5

The main CPU 409 judges, in accordance with block 1, whether the condition for execution of linear interpolation prescribed by operation of an operation panel (not shown) is satisfied or not, and if the condition is satisfied, confirms whether the arithmetic unit side can execute or not in accordance with the command request 4007 (block 2). If executable, reading, from the predetermined memory (not shown), the starting points $P_1$ ($\psi_1$, $\theta_1$, $\phi_1$, $\gamma_1$, $\tau_1$), end points $P_2$ ($\psi_2$, $\theta_2$, $\Phi_2$, $\gamma_2$, $\tau_2$), speed, acceleration or deceleration time, information for presence or absence of acceleration or deceleration, are set and returned to predetermined registers 406, 407, 408 at the arithmetic unit side. If said conditions are not satisfied, they are returned as they are, and other tasks are executed.

Figure 6:
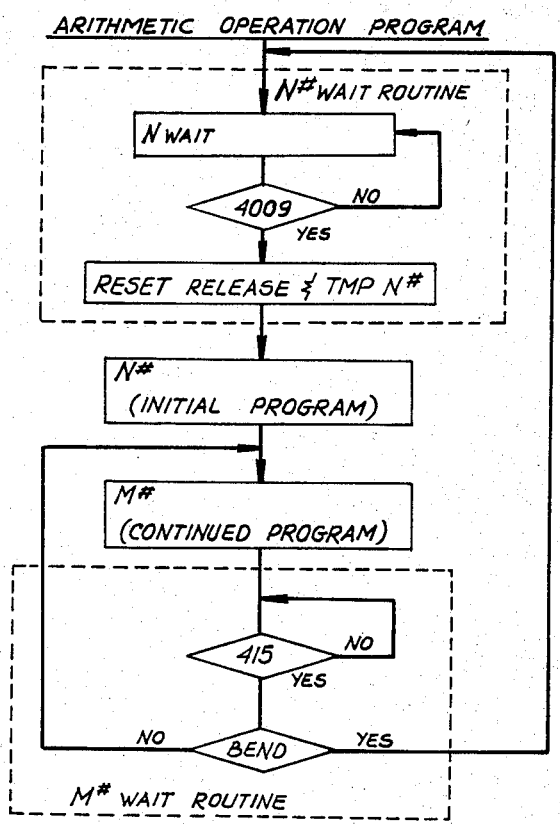
FIG. 6 is a flow chart of the linear interpolation program of the arithmetic unit.

Explanation of FIG. 6

FIG. 6 is a flow chart showing conceptionally the linear interpolation program stored in microprogram memory 402 of the arithmetic unit 400.

Figure 7:
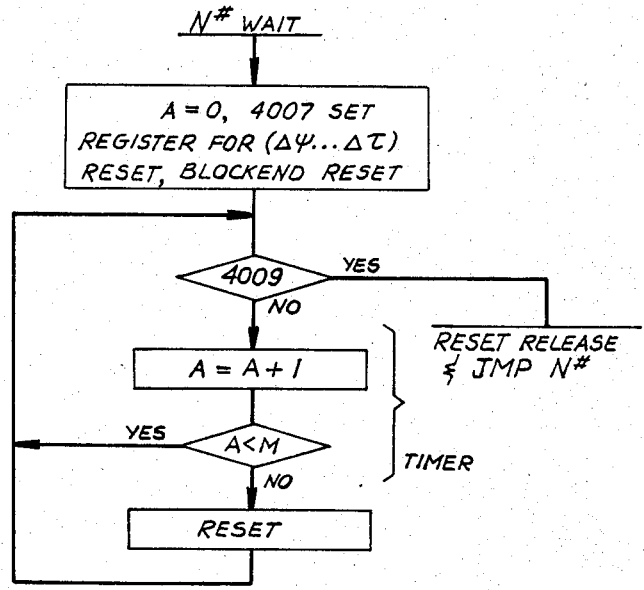
FIG. 7 is a flow chart of the N# unit routine.
Figures 1, 8:
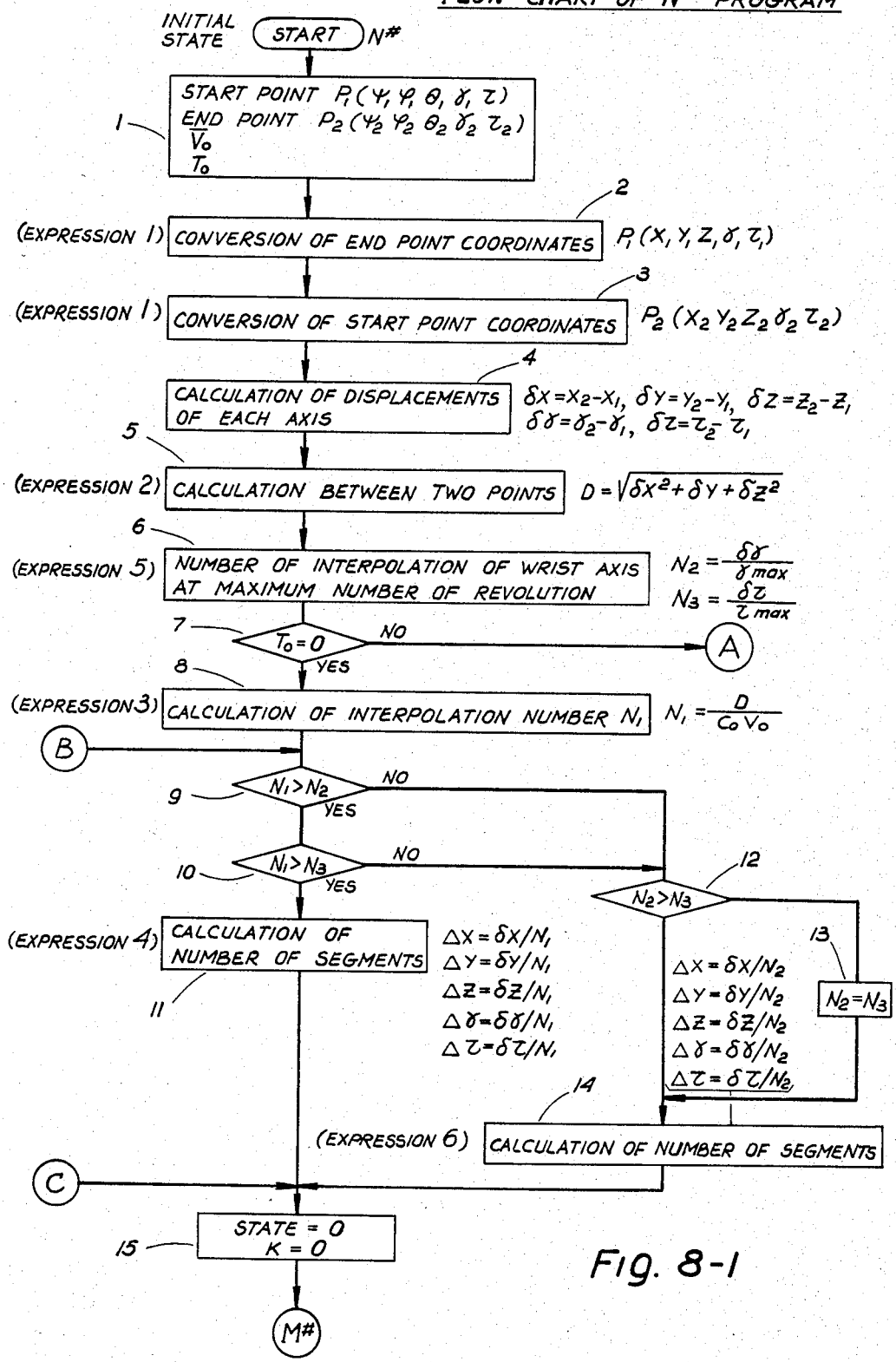
Figures 2, 8:
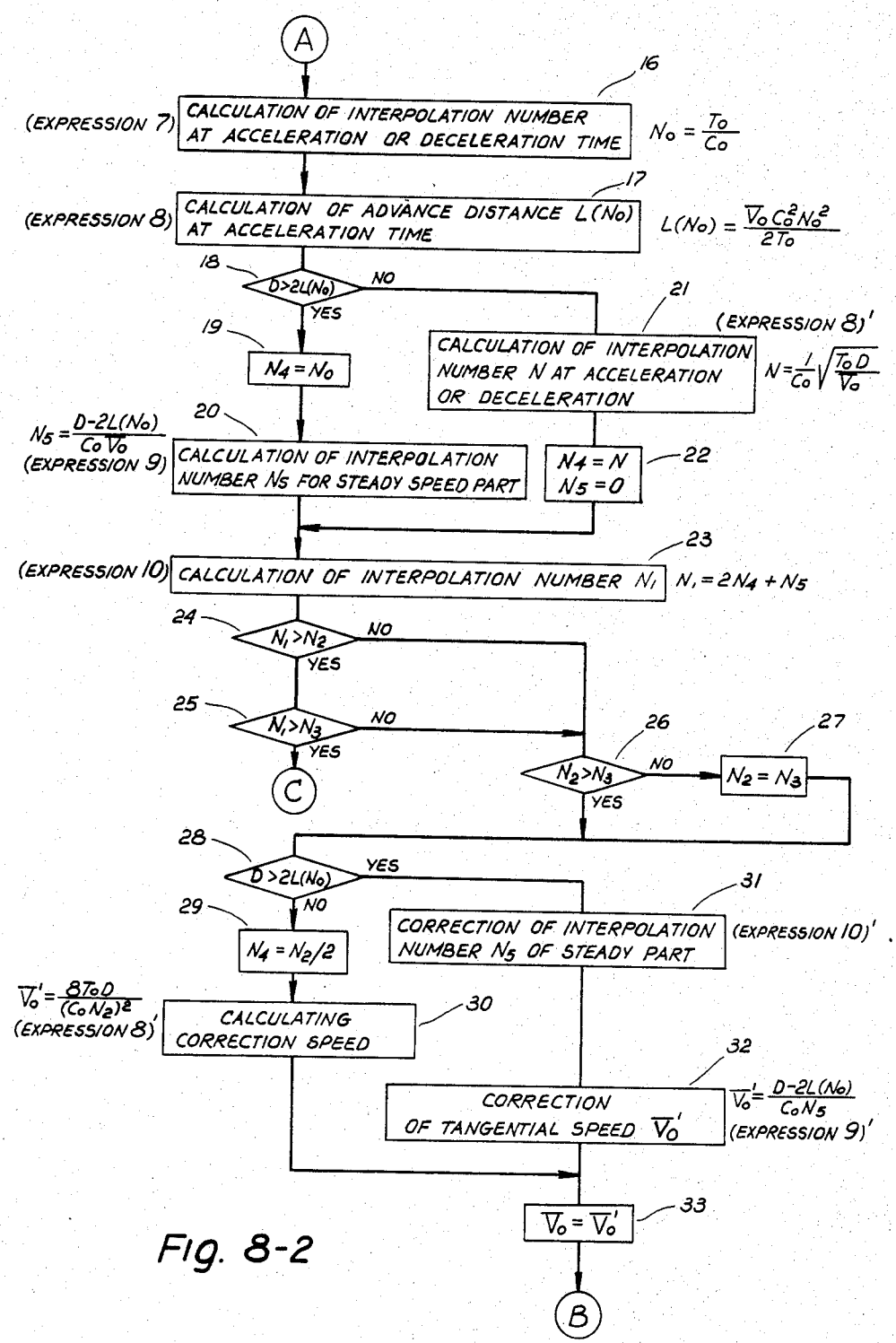
Figures 1, 9:
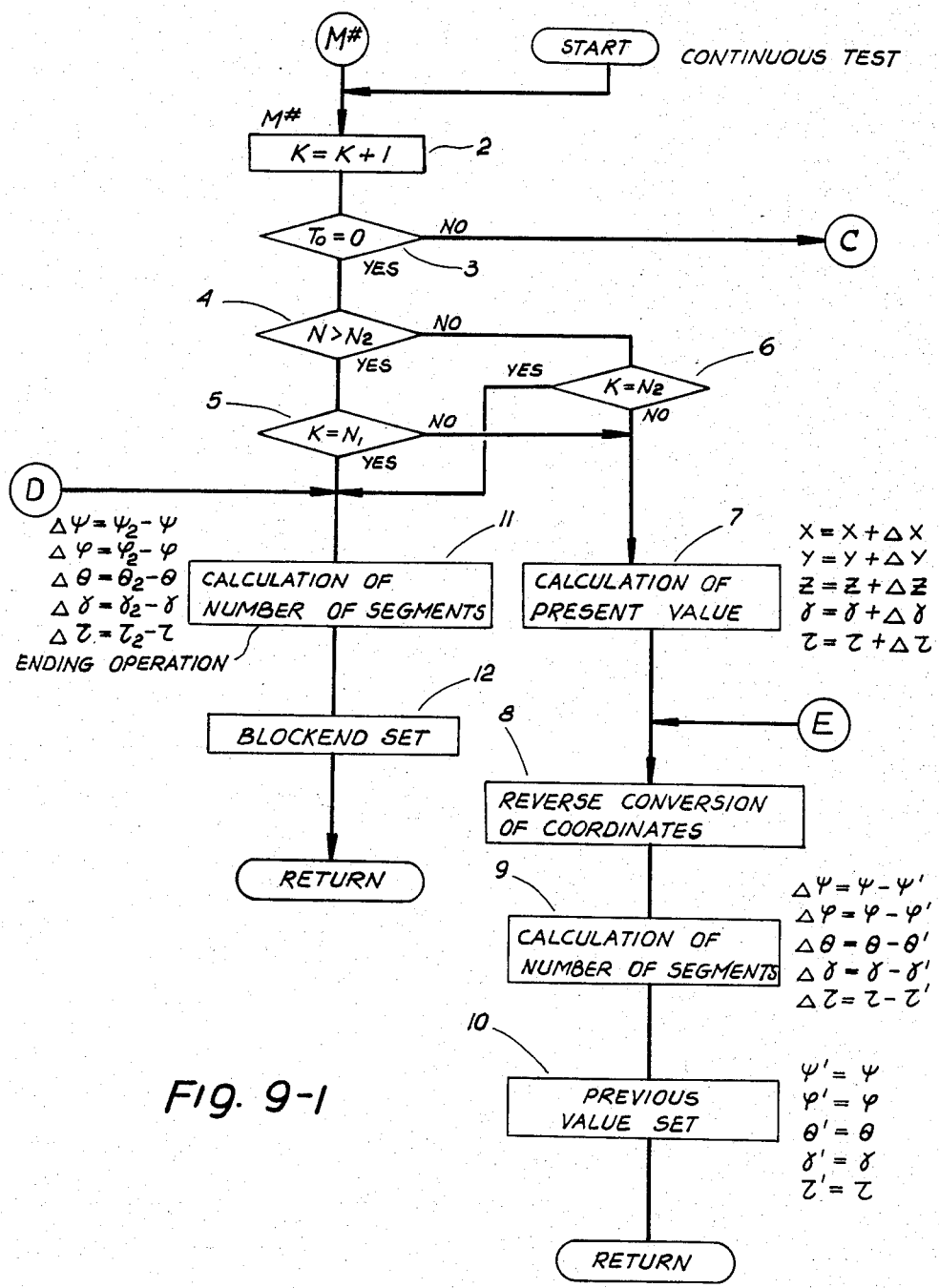
Figures 2, 9:
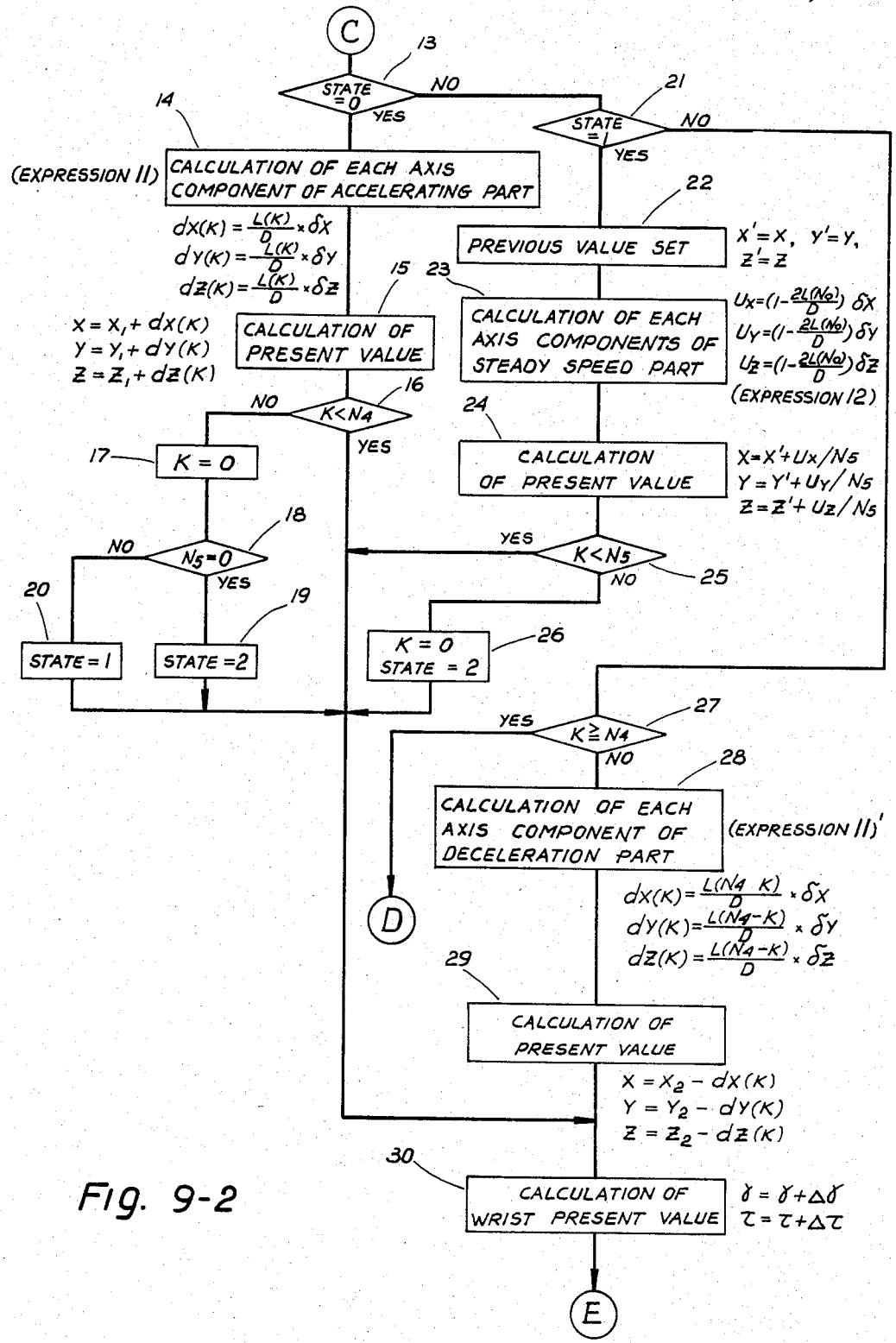

The program comprises N# wait routine, N# program (linear interpolation initial program), M# program (linear interpolation continuous program) and M# wait routine. Details of the flow chart of N# wait routine, N# program, and M# program are shown in FIG. 7, FIG. 8, and FIG. 9, respectively. Detailed descriptions will be given below.

After completion of the M# program, the process enters the M# wait routine. In the M# routine, output of 415 generated in synchronism with pulse output completion signals 4004a–4004e is tested, and self loops the result until the condition is satisfied. On the other hand, when the condition is satisfied, BLOCK END, which is the arrival information to the $P_2$ point in the continuous program, is tested, and if it is YES, it jumps to N# wait routine, and waits for arrival of the next macrocommand 4009. On the other hand, if it is not BLOCK END, M# program is immediately executed.

Explanation of FIG. 7

In the N# wait routine, command request 4007 is outputted to the main CPU, and at the same time resets the register storing segment interpolation pulses ($\Delta \psi$, $\Delta \theta$, $\Delta \Phi$, $\Delta \gamma$, $\Delta \tau$) in RALU 405 and BLOCKEND flag. Since the pulse number has already been transferred by hardware to buffers 1 (411a–411e) in synchronism with the output completion 4004a–4004e, the pulse number will not be lost. The N# wait routine is provided with a timer function, thereby the value A is reset. Next, in order to know whether the macrocommand 4009 can be outputted or not, it is tested by the test condition 4003 selected by control instruction 4002 (the case wherein a part of macrocommand 4009 becomes the test condition 4003 is not shown for the purpose of avoiding complication of the chart). If output is possible, reset signal 4008 is released, and jumps immediately to the entry of the N# program.

On the other hand, if it is not possible, the timer function works, and loops it until the predetermined time period.

If the macrocommand 4009 is not set within the preset time, reset signal 4008 is outputted, and the wait routine is looped continuously.

Explanation of FIG. 8

The N# program is the initial program when the linear interpolation is executed from points $P_1$ to $P_2$; it is executed only once for certain, and prepares for execution of the M# program.

The N# program calculates at first with respect to the initial points $P_1$ ($\psi_1$, $\theta_1$, $\Phi HD 1$, $\gamma_1$, $\tau_1$), $P_2$ ($\psi_2$, $\theta_2$, $\Phi_2$, $\gamma_2$, $\tau_2$) set in the register 1 (406), register 2 (407), the points $P_1$ ($X_1$, $Y_1$, $Z_1$, $\gamma_1$, $\tau_1$), $P_2$ ($X_2$, $Y_2$, $Z_2$, $\gamma_2$, $\tau_2$) using the Expressions 1. In the block 74, displacement of each axis between two points is obtained, and in block 5, the distance between two points is calculated by the expression 2. In the block 6, the segment interpolation numbers $N_2$, $N_3$ conform with the maximum number of revolutions of wrist driving motor based on Expression 5.

The block 7 is a branch block which judges whether or not the acceleration or deceleration time $T_0$ set in the register (408) is 0, and if it is 0, it judges that there is no acceleration or deceleration, and if it is not 0, it judges that there is acceleration or deceleration. When it is 0, the block is executed without acceleration or deceleration. Block 8 obtains total number of interpolations $N_1$ on the basis of Expression 3. Blocks 9, 10 and 12 are those which select the maximum values of $N_1$, $N_2$ and $N_3$. Block 11 calculates the amount of segment per segment interpolation number when $N_1$ becomes the maximum value, based on the Expressions 4. When $N_2$ becomes the maximum value, block 14 is executed by the Expressions 6. When $N_3$ becomes the maximum value, block 14 is executed after block 13 has been executed. Block 15 is executed in any of the above three cases. "STATE" is the status flag which denotes the cases when there is no acceleration or deceleration by 0; when there is acceleration or deceleration, the interpolation state in the accelerating section, by 0; when interpolation of steady speed portion is executing, by 1; and when in the decelerating section, by 2. K shows the present number of interpolation in each status. By initializing them, the N# program in the case where there is no acceleration or deceleration is completed, and is connected to the M# program.

On the other hand, when there is acceleration or deceleration, it is branched by the block 7, and the block 16 and the following are executed.

After executing No by Experession 7, and $L(N_o)$ by Expression 8, the block 18 is reached.

In the block 18, the distance D between two points and the moving distance 2L(No) in the acceleration or deceleration time are compared. If $D > 2L(No)$, block 19 and if $D \leq 2L(No)$, block 21 is executed. In the case of $D > 2L(No)$, there is a steady speed part; segment interpolation number $N_s$ in the steady speed part in the block 20 is calculated by the Expression 9, and proceeds to the block 23.

On the other hand, if $D \leq 2L(No)$, N is calculated by substituting D/2 for the left side of the Expression 8 in accordance with block 21, and setting it to $N_4$ in accordance with block 22. In this case, there is no steady speed part, $N_s$ is set as $0 (N_s = 0)$. Connected to the block 23 from the block 22, two pulses branched in the block 18 join together. The block 23 obtaines the total interpolation number $N_1$ from the Expression 10 when there is acceleration or deceleration.

The blocks 24, 25 and 26 are branch blocks selecting the maximum value of $N_1$, $N_2$ and $N_3$. When $N_1$ becomes maximum it advances to the block 15, STATE, K is initialized and transfers to the M# program. When either $N_2$ or $N_3$ is selected, a slight change is found in the description of the main sequence, and is rearranged.

When $N_2$ becomes maximum, it advances to the block 28. When $N_3$ becomes maximum, it reaches the block 28 through the block 27. The block 28 is a branch block (the same as the block 18) and when $D > 2L(No)$, this results in recalculating segment interpolation number $N_5$ in the steady speed part in substituting $N_2$ for $N_1$ in the Expression 10, advancing to the block 32 where the correction speed is calculated with $V_0'$ as a variable from the Expression 9, and in the block 33, the newly obtained speed $V_0'$ is set as $V_0$.

On the other hand, in the case of $D \leq 2L(No)$, this program reaches the block 30 calculating new speed $V_0'$ from the Expression 8 through the block 29. Advancing to the block 33 from the block 30, two operation paths branched in the block 28 join together at the block 33. After execution of block 33, the program returns to the block 9. Calculating the amount of the segment interpolation per number of interpolation of the wrist corresponding to the maximum values of the segment interpolation numbers $N_1$, $N_2$ and $N_3$, it is connected to the M# program through the block 15.

Program of FIG. 9

The M# program calculates a new segment interpolation pulse number triggered by the output of the reference clock address generator 415 on the basis of each value calculated by the N# program.

At the entry address M# of this program, there are the route connected from N# program and the route driven by the 415 output, but both of them advanced to block 2.

The block 2 increments K for controlling the interpolation number.

The block 3 compares the values of $N_1$ and $N_2$ in the branch block 4 when there is no acceleration or deceleration in the branch block for presence/absence of the acceleration or deceleration specification. If $N_1 > N_2$, the block 5 discriminates as to whether or not the interpolation number K reaches to the number $N_1$ to the end point. If $K = N_1$, the block 11 calculates the amount of segment interpolation necessary to be put at the end point on the coordinates of the robot, and sets the Block END flag showing completion of outputting in the block 12, thus completing all the operations. On the other hand, in the case where $N_2 > N_1$ and $K = N_2$, too, the program passes the same operational route as described above through the blocks 4 and 6. In the case of $K \neq N_1$ or $K \neq N_2$, the program reaches the block 7, calculates a new present value, and reaches the block 8. The block 8 carries out reverse conversion of the coordinates using the Expressions 1 for the reverse conversion based on the new present value, and obtains a new present value of the robot coordinates, thus obtaining the difference between the new present value and the previous value of the robot coordinates in the block 9, and calculating segment pulse values for each axis of the robot, to complete the operation.

On the other hand, in the case when acceleration or deceleration is indicated in the block 3, it is connected to the block 13. In the block 13, discrimination is made as to whether STATE=0 or not, that is, whether the interpolation is in the acceleration region or not. This flag has been initialized at the end of the N# program.

In the case where "during acceleration period" is shown, operation of each axial components for acceleration parts is carried out based on new K increments in the block 2 by the block 14. Next, the present value on the new orthogonal coordinates is calculated by the block 15, and reaches the block 16. In the block 16, judgement is effected to ascertain whether or not the interpolation number K is smaller than $N_4$ calculated by the N# program. If $K > N_4$ it advances to the block 30, calculates the new present value of the wrist axis, and advances to the reverse conversion of coordinates of the block 8. After the block 8, the process is carried out as described above. When $K \geq N_4$ in the block 16, the program reaches block 17, where the interpolation number K is initialized. This shows that STATE=0, that is, completion of the acceleration section. In the block 18, whether the interpolation number $N_5$ of the steady speed part is 0 or not is judged, and if it is 0, STATUS flag "STATE" is set at "2" and not "1" in the block 19, and transfers to the deceleration section being triggered by said 415 output of the next time.

In the case of $N_5 \neq 0$, steady speed section is selected in the block 20. Both blocks 19 and 20 advance to the block 30 after completion of execution, and thereafter pass through the operation route. When STATE≠0 in the block 13, the program advances to block 21, and judges whether STATE=1 or not, that is, whether or not the present interpolation relates to the steady speed part.

In the case of the steady speed state, the previous value is set in the block 22, and advances to the block 23. In the block 23, each axial component on the orthogonal coordinates relative to the steady speed part is calculated basing on the Expression 12. In the block 24, a new present value is calculated, and advances to the block 25.

The block 25 judges whether or not the present interpolation number K reaches the completion number of the steady speed part. If $K < N_5$, the completion number is not reached yet, advances to the block 30, and operation is as described above. On the other hand, if $K \geq N_5$, the program is considered to have reached the completion number, and prepares to enter into the next STATE, that is, the deceleration section in the block 26, and advances to the block 30.

On the other hand, when STATE≠1 in the block 21, it shows that it has already entered into the deceleration section, and advances to the block 27. The block 27 judges whether the interpolation number K is in the final period or not. If it is the final period, it advances to the block 11, and reaches the route which calculates the difference between the robot coordinates value at point $P_2$ and the present value as the segment interpolation pulse number.

On the other hand, when the interpolation number does not reach the final period, the program advances to the block 28, calculates each of the axial components (orthogonal coordinates) of the deceleration part by arranging the Expression 11, and in the block 29 calculates a new present value. Then, it advances to the block 30, and the following procedure is the same as that described repeatedly.

Explanation of FIG. 10

FIG. 10 is supplemental to FIG. 4 on hardware.

FIG. 10-A explains the connection between RALU (405) and the buffer 1 (411a–e). The segment interpolation pulse calculated in the M# program has been stored in the predetermined register. The register is directly connected to the buffer 1 on the corresponding drive motor shaft, and the data set by the microprogram are considered to be always outputted.

FIG. 10-B shows timings of data transfer between each of the register in RALU 405 buffers 1 (411a–e), buffers 2 (412a–e), and BRMs (413a–e). At the rise of output the completion pulse, data in the buffers 1 (411a–e) are transferred to each of the buffers 2 (412a–e), and at the trailing edge of the output completion pulse, the data of the registers in RALU (405) are transferred respectively to the buffers 1. In FIG. 10, K−1, K, K+1, K+2 show transition of interpolation number controlled by the M# program, that is, transition of segment interpolation pulse data, as described in the explanation of the M# program in FIG. 9.

As seen in FIG. 4, between the buffer 1, for example, 411a and buffer 2, for example, 412a, the same output completion signal, for example, 4004a is connected as the LOAD signal. However, as described above, since LOAD of data to the buffer 2 is effected at the rise of the output completion signal, and LOAD to the buffer 1 is effected at the fall of the output completion signal, the data will not be lost, but are transferred properly.

As is apparent from the above description, according to the invention, linear interpolation is carried out with high accuracy while the wrist is finely controlled by the linear interpolation apparatus which is composed of the associated arithmetic unit and the BRMs with the buffers. The apparatus is low in manufacturing cost and simple in construction. Therefore, teaching can be readily achieved when the articulated robot is applied to an object which has a number of linear parts.

In other words, in the invention, in the case where the articulated robot is operated between two points, which are specified in advance, by linear interpolation control, interpolation is effected by calculating the amounts of increment in position for every reference clock pulse which amounts are defined by the distance between two points, the specified tangential speed and the reference clock. Therefore, (1) When the tangential speed is in a low range, the interpolation precision is guaranteed to be less than one position detection pulse of each articulation drive axis. In practice, an interpolation error can be neglected even when the tangential speed is in a high range.

(2) When a specified point to be subjected to linear interpolation is switched, no inter-block stop is caused. Therefore, the specified points can be connected while linear interpolation is effected between them.

(3) As the linear acceleration and deceleration control function is provided, when the robot is stopped after the high speed linear interpolation, it is scarcely vibrated.

(4) The arithmetic control is effected so that the postures of the wrist bending axis and the turning axis of the robot at the start and the end point are changed uniformly with respect to distance.

(5) In the case where the linear interpolation distance is relatively short as in the case when the direction of a straight line is changed and it is required to abruptly change the posture of the wrist, linear interpolation is carried out with the amounts of increment in posture of the wrist instead of the amounts of increment in position which are obtained every reference clock.

What is claimed is:

1. In a control device for an industrial articulated robot which operates according to a teaching playback method, in which linear interpolation between two predetermined points is carried out, and dividing means are provided to divide a distance between said two points into segments which are determined by a command velocity, an interpolation time interval and the distance between said two points, said device having means for determining interpolation increments of motion along articulation drive axes, said interpolation increments corresponding to said segments, the improvement comprising: first means for changing the number of segments for every interpolation time interval so that, when a wrist axis speed is smaller than a speed corresponding to a maximum speed of revolution of a drive electric motor of said wrist axis, the orientation of said wrist is controlled to move at a uniform speed between said two points, and so that when said wrist axis speed exceeds the speed corresponding to the maximum speed of revolution of said drive electric motor, a second means changes the number of segments for every interpolation time interval so that the rate of movement in posture of said wrist does not exceed the speed corresponding to the maximum speed of revolution of said drive electric motor.

2. A control device as claimed in claim 1, including:
a microprogram memory for storing a microprogram for instrucing all arithmetic processes;
a sequence controller operating as an address controller which controls an execution sequence of microinstructions stored in said microprogram memory;
a pipe line register operating as a buffer register for said microprogram memory;
a register and arithmetic logical unit comprising a logic and arithmetic operation unit and programmable registers, for executing arithmetic instructions specified by a microprogram;
first and second registers for storing pulse numbers from the original positions of articulation drive axes at linear interpolation start and end points;
a third register for storing data of linear interpolation tangential speed, one of acceleration and deceleration time and one of presence and absence of one of acceleration and deceleration;
a multiplexer for giving test conditions to said sequence controller according to control instructions from said pipe line register;
a main central processing unit for setting data of start and end points, tangential speed, one of acceleration and deceleration time and one of presence and absence of one of acceleration and deceleration in said first through third registers according to a command request from said pipe line register, and applying a macrocommand to said sequence controller;
a two-stage buffer pulse outputting unit including first buffers which store increment pulses numbers which are to be outputted with the next reference clock of the articulation drive shafts from said register and arithmetic logical unit, second buffers which store increment pulses numbers which are being outputted and binary rated multipliers which carry out pulse outputting by uniformly distributing pulse numbers stored in said second buffers as pulses synchronous with a first clock which is higher in frequency than said reference clock within the period of said reference clock;
a frequency division and differentiation circuit for producing said reference clock by frequency-dividing said first clock and by differentiating the rise thereof; and
a reference clock address generator which receives said reference clock and applies instructions to said sequence controller so that said sequence controller performs addressing necessary for arithmetic processing.

* * * * *